United States Patent [19]
Havas et al.

[11] Patent Number: 5,418,706
[45] Date of Patent: May 23, 1995

[54] WIDE LOAD MATCHING CAPABILITY POWER SUPPLY

[75] Inventors: George Havas, Youngstown; Arthur L. Vaughn, Niles, both of Ohio

[73] Assignee: Ajax Magnethermic Corporation, Warren, Ohio

[21] Appl. No.: 983,813

[22] Filed: Dec. 1, 1992

[51] Int. Cl.[6] .............................................. H02M 7/523
[52] U.S. Cl. .......................................... 363/57; 363/135
[58] Field of Search .................. 363/27, 28, 56, 57, 363/58, 131, 132, 135, 136, 138

[56] References Cited

U.S. PATENT DOCUMENTS

| | | | |
|---|---|---|---|
| 3,406,330 | 10/1968 | Pelly | 363/96 |
| 3,465,233 | 9/1969 | Johnston et al. | 363/135 |
| 3,821,632 | 6/1974 | Rylicki | 363/96 |
| 3,842,339 | 10/1974 | Hoffman | 363/136 |
| 3,860,864 | 1/1975 | Fitz | 363/15 |
| 3,967,184 | 6/1976 | Chalmers et al. | 363/135 |
| 4,225,912 | 9/1980 | Messer | 363/57 |
| 4,286,317 | 8/1981 | Kommisari | 363/136 |
| 4,290,101 | 9/1981 | Hergenhan | 363/65 |
| 4,336,585 | 6/1982 | Moriarty et al. | 363/136 |
| 4,442,479 | 4/1984 | Makimaa | 363/58 |
| 4,608,627 | 8/1986 | Holt | 363/131 |

Primary Examiner—Jeffrey L. Sterrett
Attorney, Agent, or Firm—Fay, Sharpe, Beall, Fagan, Minnich & McKee

[57] ABSTRACT

A high frequency power inverter comprises a power supply, a thyristor for switching the energy from the power supply to a load and a neutral capacitor for storing energy cyclically to assure reverse voltage is applied to the thyristor. A clamp circuit is associated with the switch to limit the ring-up voltage on the capacitor to a preselected value. The clamp circuit is comprised of an inductor having a relatively large value for permitting a gradual leaking of the capacitor voltage during an inverting of the power supply voltage to the load so that the capacitor can ring-up to a higher value than the supply voltage. The inductor is selected so that under all conditions, the voltage on the capacitor will be safely larger than the power supply voltage plus a load voltage peak for a time long enough to assure thyristor turn off.

10 Claims, 8 Drawing Sheets

WIDE LOAD MATCHING CAPABILITY POWER SUPPLY

BACKGROUND OF THE INVENTION

This invention pertains to the art of electrical power generators and more particularly to high frequency and high power solid state inverter systems for supplying alternating current at frequencies in the range of 50 kHz.

The invention is particularly applicable for use as a power supply for an induction heating system for energizing a heating coil and will be described with particular reference thereto. However, it will be appreciated that the invention may have broader applications in various other industrial processes such as those that involve a varying impedance load, and may be advantageously employed in such other environments and applications.

High frequency power inverters for supplying energy to induction heating coils are well known. U.S. Pat. No. 3,821,632 shows one such system and is particularly referenced herein for its showing of a common attribute among such inverters, that is, a precharge circuit. FIG. 1 of the subject application shows a simplified schematic representation of the system shown in the '632 patent. Such a circuit is commonly referred to as a charge/discharge circuit ("C/D circuit") for reasons that will be evident from the following brief description of its operation. The load is generally designated with the numeral "10" and typically comprises a tank circuit that receives its power from transformer T1, although in some circumstances a transformer may not be needed. The load is represented by an LRC circuit. As noted above, the inverter supplies an alternating current to the load from a direct current power supply. In the first half cycle the supply voltage 14 charges capacitor C1 through inductor L1 when SCR1 is fired. (The circuit is described with reference to SCRs as switches, although many types of thyristors or other switch devices could be successfully employed.) This is the "charge" aspect of the inverter. Next SCR1 is turned OFF and SCR2 is turned ON to discharge C1 through L3 and the load. Similarly, the second half cycle is initiated by firing SCR3 which charges capacitor C2 through inductor L2. Then SCR4 discharges capacitor C2 through inductor L4 and the load. During subsequent steady state operation, if there is residual voltage on capacitor C1 in excess of the voltage level of supply 16, then diode D1 exerts a clamping action to maintain a controlled voltage on capacitor C1 limited to the supply voltage. Similar clamping action is maintained by diode D2 on capacitor C2. All thyristor firing pulses are generated from an essentially free running oscillator with its repetition rate being limited by any number of circuit limit conditions. The inductances represented by L5 and L6 are unavoidable leakage inductances which are typically minimized as much as possible to avoid inhibiting the clamping action of diodes D1 and D2. The inductances L3 and L4 are chosen to form a discharge current pulse with an appropriate width for the load resonant frequency, while the inductances L1 and L2 are chosen for an appropriately fast charge of the capacitors C1 and C2 within the limit of the SCR1 and SCR3 DI/DT capabilities.

In summary, the circuit clearly includes a precharge circuit which does not include the load and only delivers energy from the supply to the charge capacitors C1 and C2. The discharge portion of the circuit discharges C1 and C2 into the load where the energy is partially dissipated; that is, in order to deliver the energy of the DC supply to the load a charge/discharge action must take place. This results in undesirable losses occurring both in the charge and discharge circuit for every unit of energy delivered to the load.

The perceived advantages of such a circuit are that the charge and discharge circuits are isolated for safety of operation and the clamping circuit provides a controlled limit for the ring-up voltage on the discharge capacitor C1.

Several notable problems exist with such C/D inverters. First, it is readily apparent that the circuit is complicated in its timing operation and because of its use of so many components. Second, it is inefficient in that for each and every half cycle of power delivered to the load, associate losses are incurred in the necessary precharge of the inverter. Third, a load matching problem exists. FIG. 3 of the application represents the load matching range of a prior art C/D inverter. The significance of this FIGURE is that for an induction heating load, as the load workpiece varies in temperature, its conductance will vary on the abscissa of the graph. The narrower the full power delivery curve is at the peak, the less likely it is for the inverter to deliver full power to the load as the load condition changes.

The present invention contemplates a new and improved inverter which overcomes all of the above referred to problems and others to provide a new high frequency power inverter which is simple in design, requires a reduced number of components, has a wide range load matching capability readily adaptable to a plurality of loads and will still provide full power, is highly stable and can dependably assure a reverse voltage to be applied to the thyristors cyclically.

BRIEF SUMMARY OF THE INVENTION

In accordance with the present invention, there is provided a high frequency power inverter comprised of a power supply, a thyristor for switching the energy from the power supply to a load and a neutral or commutating capacitor for storing energy cyclically to assure reverse voltage is applied to the thyristor. A clamp circuit is associated with the thyristor to limit the ring-up voltage on the capacitor to a preselected value. The clamp circuit is comprised of an inductor having a relatively large value for permitting a gradual but controlled leaking of the capacitor voltage during an inverting of the power supply voltage to the load so that the capacitor can ring-up to a higher value than the supply voltage. The inductor is selected so that under all conditions, the voltage on the capacitor will be safely larger than the power supply voltage plus a load voltage peak for a long enough time to assure thyristor turn off.

In accordance with another more limited aspect of the invention, the commutating capacitor is commonly connected to both a first and a second thyristor and disposed relative to the power supply to alternate power through the load. A clamp circuit disposed to limit the ring-up voltage of the capacitor comprises a series connected diode and inductor.

One benefit obtained by use of the present invention is a high frequency and wide range load matching power inverter comprised of a reduced number of components in comparison to previously known charge/discharge inverters.

Another benefit is a high frequency power inverter which enables operation in a wide range of load impedances or load conductances and can still deliver full nominal power. The necessity of making matching transformer changes at the load is accordingly substantially reduced and the range of stability, that is, the range in which the inverter can safely start and run, is accordingly widened.

Yet another benefit of the subject invention is a power inverter which is more energy efficient than prior known inverters in that it avoids a precharge circuit and the associated losses therein.

Other benefits and advantages of the subject new power inverter will become apparent to those skilled in the art upon a reading and understanding of this specification.

BRIEF DESCRIPTION OF THE DRAWINGS

The invention may take physical form in certain parts and arrangements of parts,.the preferred and alternative embodiments of which will be described in detail in this specification and illustrated in the accompanying drawings which form a part hereof, and wherein.

DETAILED DESCRIPTION OF THE PREFERRED EMBODIMENTS

Figure 2:
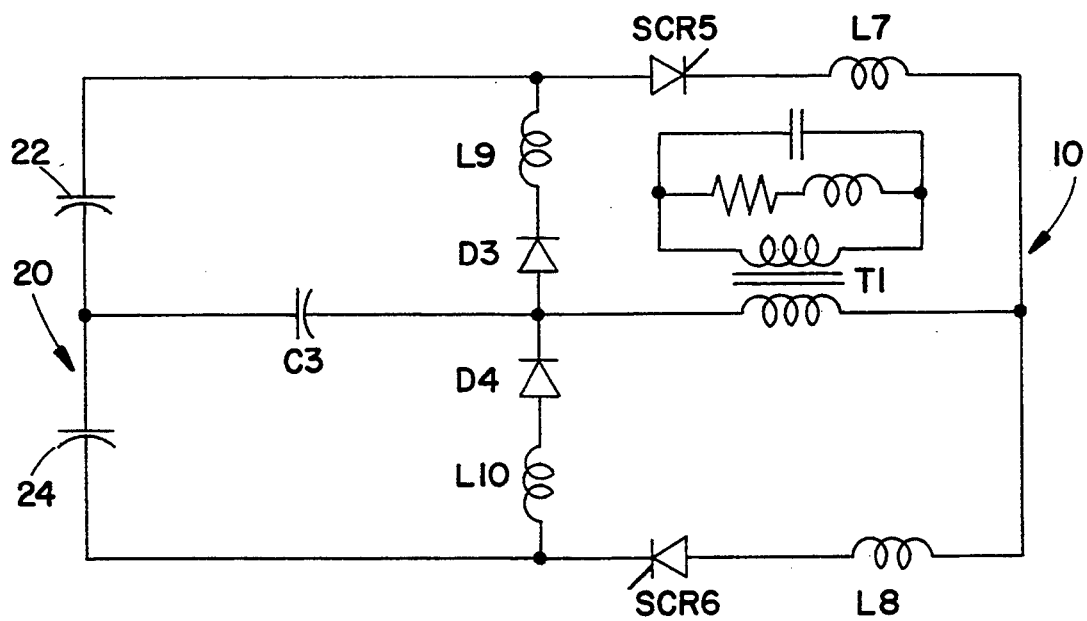
FIG. 2 comprises a schematic drawing of a power inverter made in accordance with the present invention.

Referring now to the drawings wherein the showings are for purposes of illustrating the preferred embodiments of the subject invention only and not for purposes of limiting same, FIG. 2 shows a schematic drawing of a preferred embodiment of the present invention. The supply voltage 20 is comprised of a first voltage source 22 to power the first half cycle of the alternating current and a second voltage source 24 to supply energy for the second half cycle. The load 10 comprises a conventional tank circuit such as is typically used in induction heating. Energy is passed to the load through transformer T1 although a transformer may not be necessary. Current is switched to the transformer T1 during the first half cycle by a thyristor such as SCR5 and through inductor L7. When the thyristor is turned on, energy is delivered to the load 10 from the supply 22 in the following path. The current flows through SCR5, through load 10 which normally is a tank circuit, and then charges the commutating capacitor C3 which is a series capacitor. (It can be seen that the commutating capacitor C3 is disposed in series to receive a charge from either the first or second voltage sources 22, 24, depending upon the half cycle.) Normally the capacitor CS will charge up (or ring up) to a higher voltage than the supply voltage due to the resonant action of the circuit. However, as soon as the capacitor voltage reaches a value higher than the supply voltage highest value, the dynamic clamping circuit comes into effect so that current will be, at a measured rate, leaked off of the capacitor C3 via diode D3 and inductor L9. Each of the thyristors is associated with such a clamping circuit. For SCR6 it is shown as diode D4 and inductor L10.

Figure 4:
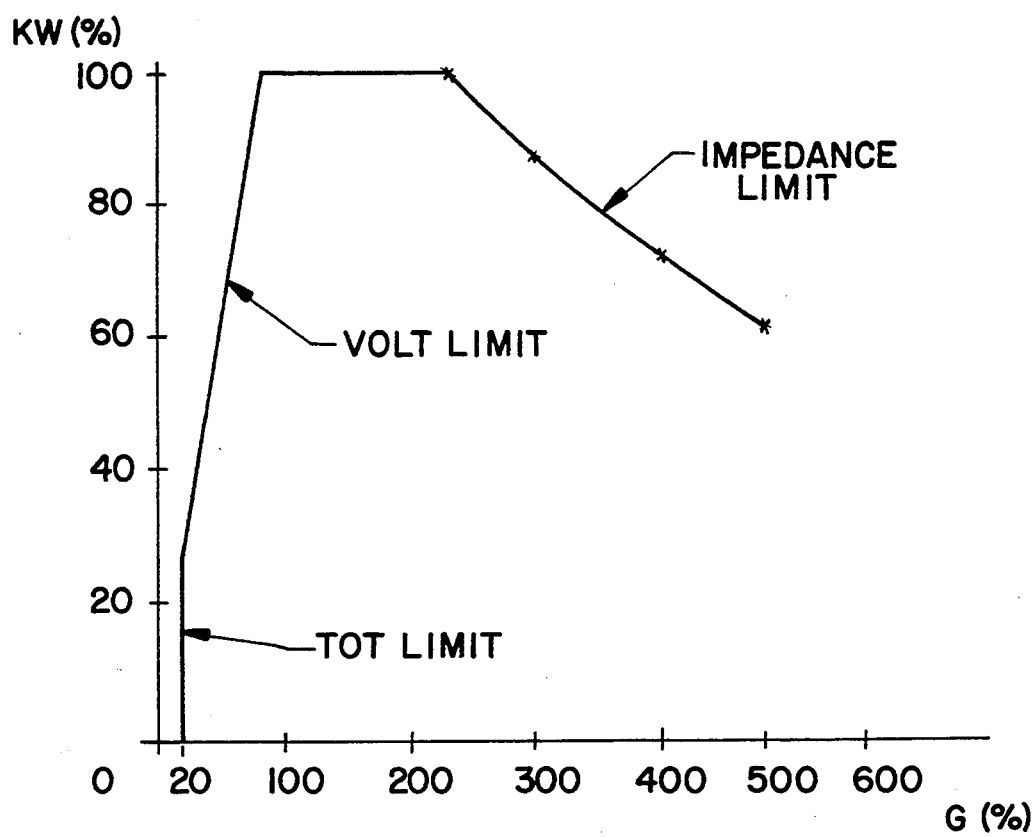
FIG. 4 is a similar schematic representation to that of FIG. 3 but rather for the inverter of the subject invention.
Figure 3:
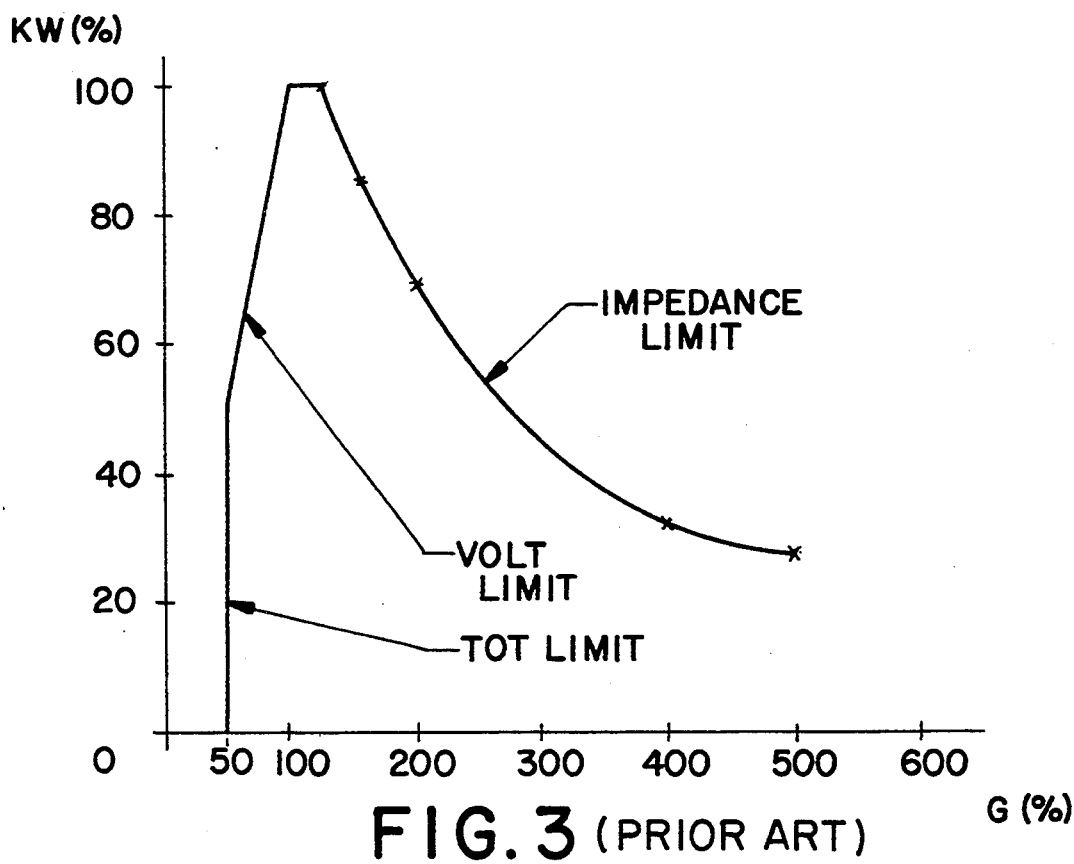
FIG. 3 is a graphical representation of KW vs. G curve for the system shown in FIG. 1.

It is a particular feature of the invention that the inductor L9 is purposefully selected to be a relatively large inductor, larger by more than an order of magnitude than the series inductor L7. The use of such a large inductor results in a gentle and controlled leak of the capacitor C3 voltage, while allowing the capacitor to charge up to a voltage level higher than the level of the supply voltage. More particularly, in normal steady state operation, the capacitor C3 voltage will be a much higher magnitude than what the supply voltage and tank voltage values are, thereby assuring a safe reverse voltage to be applied in a reverse direction across SCR5 for safely turning it off after the current ceases to flow. The voltage then is slowly leaked off of capacitor C3 even though other inverters (not shown) could be turned on and the tank voltages oscillated at a much higher frequency rate. The voltage on the capacitor C3 remains safely at the higher value which is necessary to maintain the turn-off time on SCR5. In the second half-cycle, SCR6 is turned on which then delivers energy from supply 24 and also discharge the capacitor C3 into the load via inductance L8 and SCR6. When the voltage on the C3 capacitor has completely reversed and its value becomes larger than the voltage of source 24, the negative dynamic clamping circuit comes into action and voltage is leaked off via L10 and D4 from C3 again in a slow and measured manner. This oscillatory charging of the tank circuit 10 and the capacitor C3 and reversing the charge of capacitor C3 is then repeated sequentially between the positive SCR5 or positive half of the circuit and the negative SCR6. The key to the circuit is the dynamic clamp action which allows not only a safe turn off of the thyristors but also a natural regulation which allows a matching to a widely varying impedance load. This can be seen by looking at FIG. 3 versus FIG. 4. FIG. 3 is a typical charge/discharge impedance matching diagram. FIG. 4 is the impedance matching typical of the subject invention. It can be seen that one hundred per cent power is delivered to the load over a much greater percentage of G than in the prior art circuit.

The only important design limitation in selecting the value of the circuit components is that the sum of the supply voltage plus a tank circuit voltage peak remains less than the possible ring-up value of the capacitor C3 to ensure a long enough time during inversion of the circuit to permit a thyristor turn off. Nevertheless, a gradual leaking of the capacitor C3 voltage occurs during an inversion of the supply voltage to the tank circuit by the switching of the first and second thyristors.

Hence, the steady state operation of the foregoing inverter is very simple. SCR5 and SCR6 are fired by a square wave oscillator in alternating sequence. The oscillator (not shown) is essentially free-running with its repetition rate being limited by preselected circuit limit conditions.

Series resonant current pulses with a width appropriate to the load resonant frequency are formed by the action of L7 and C3 for the first (positive) half cycles and by the action of L8 and C3 for the second (negative) half cycles. As in the prior art charge/discharge inverter, the capacitor C3 would ring-up uncontrollably without the clamp action of diodes D9 and D10; however, in the subject invention, the purposely large values of the clamp leg inductances L9 and L10 cause the dynamic clamp action which provides the unique operating characteristics of the invention. Capacitor C3 is allowed to ring-up to a relatively high but controlled voltage, which leads to a number of operational advantages.

Figure 1:
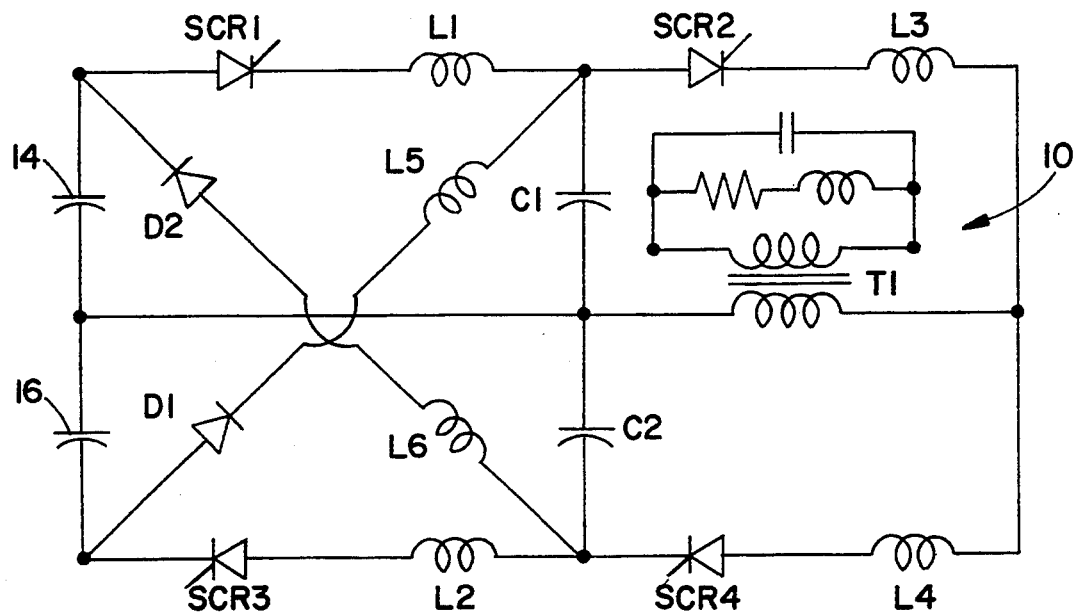
FIG. 1 comprises a schematic drawing of a prior art high frequency power inverter.

The advantages of the subject invention are several. First, as can be seen when compared to the prior art circuit of FIG. 1, there are half as many thyristor poles and half as many high frequency capacitors. In addition to the circuit being simpler, the operation is simpler. There is no need for a preliminary charge of the commutating capacitor. The reduction of current carrying components automatically increases efficiency while at the same time reducing costs. The dynamic clamping action caused by inductors L9 and L10 causes a load matching range that significantly exceeds that of the charge/discharge inverter because of the excess kVA that can be drawn from the pumped up voltage on the capacitor C3. This can be seen graphically with reference to FIG. 4. Finally, the higher voltage on capacitor C3 allows more reliable thyristor commutation under a wide range of load conditions. The higher voltage of capacitor C3 provides a safer circuit since turn-off time is assured for the thyristors after current therein goes to zero. It also allows the operation of a number of the inverters in a sequential manner for the delivery of the full repetition rate required for the actual tuned frequency of the tank circuit which is desired to be powered.

Preferably, the circuit is designed to operate at one-third frequency of the tuned load circuit. In the particular application graphically illustrated below, a 50 kHz frequency is intended to be generated in the load so that each inverter will operate at a frequency lower than or up to 16.66 kHz. The basic purpose of such a system is to be able to run each inverter at this lower frequency and safely shut the thyristors off while the load (tank circuit) continues ringing at the higher frequency (50 kHz). Each inverter circuit is connected in a sequential type of operation, where two or three inverters would be sequenced so that each of the inverters would run at a one-third frequency of the total output, so that for the three a total output frequency of 50 kHz could be obtained.

Figure 13:
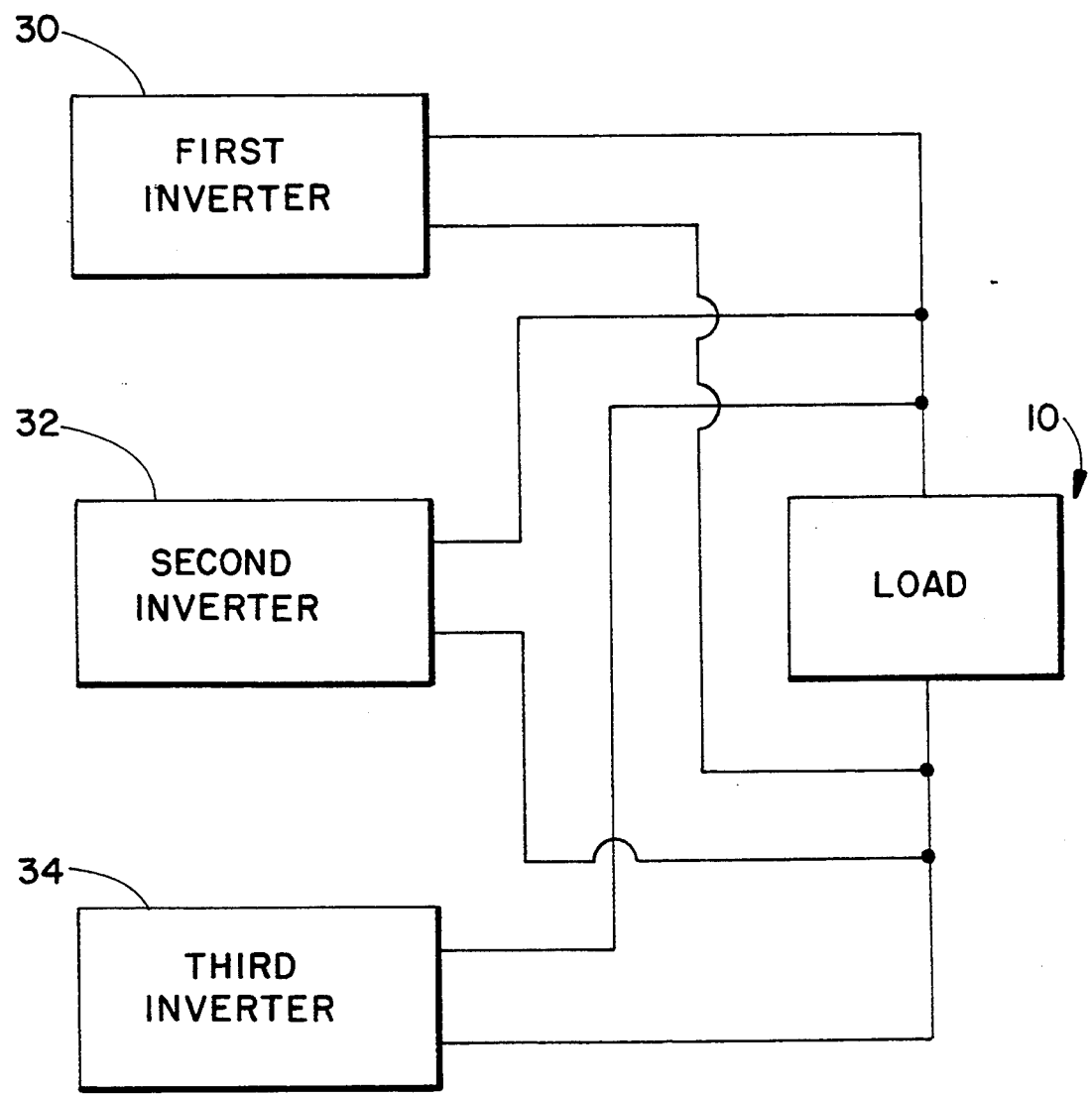
FIG. 13 illustrates a plurality of staged inverter circuits each preferably outputting a third of the desired total output frequency to the load.

FIG. 13 illustrates such an assembly where three inverter circuits 30, 32 and 34 comprise first, second and third stage inverter circuits wherein each is such as are shown in FIG. 2. Each operates at a one-third frequency of the total output so that the total output frequency to the load 10 is the sum of the three.

Figure 5A:
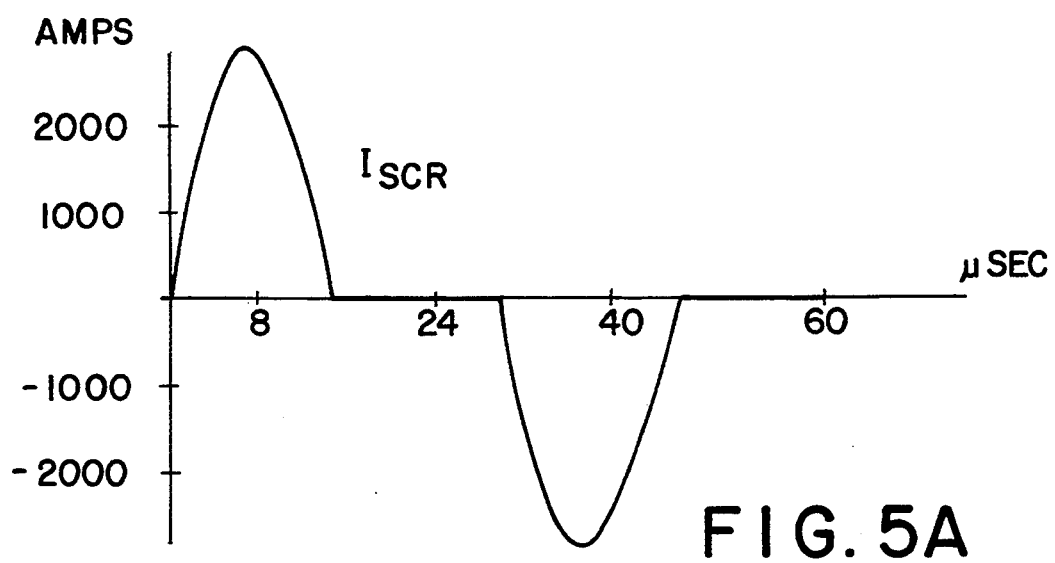
FIGS. 5A–5E are graphical representations of the relative operating characteristics of the circuit of FIG. 2.
Figure 5B:
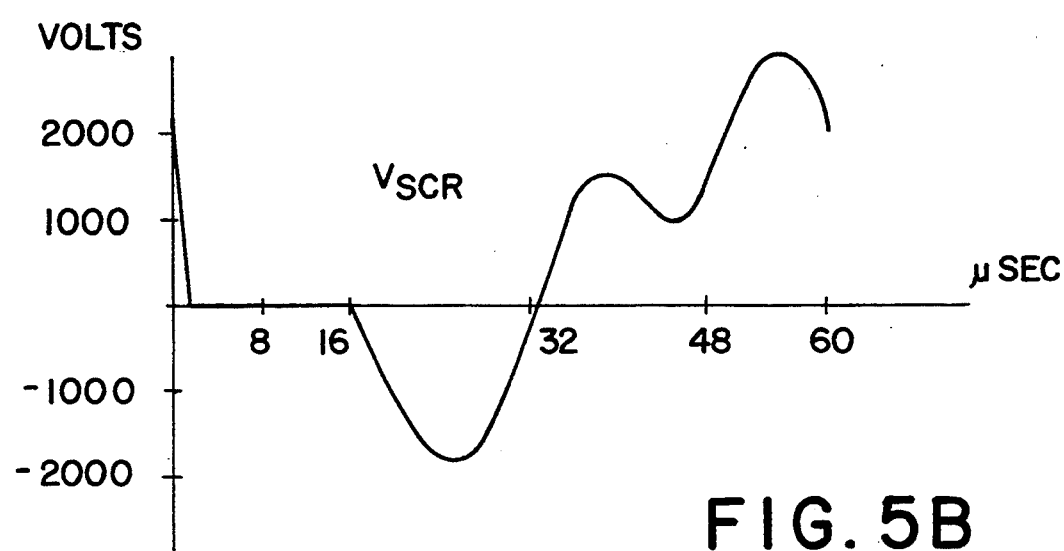
Figure 5C:
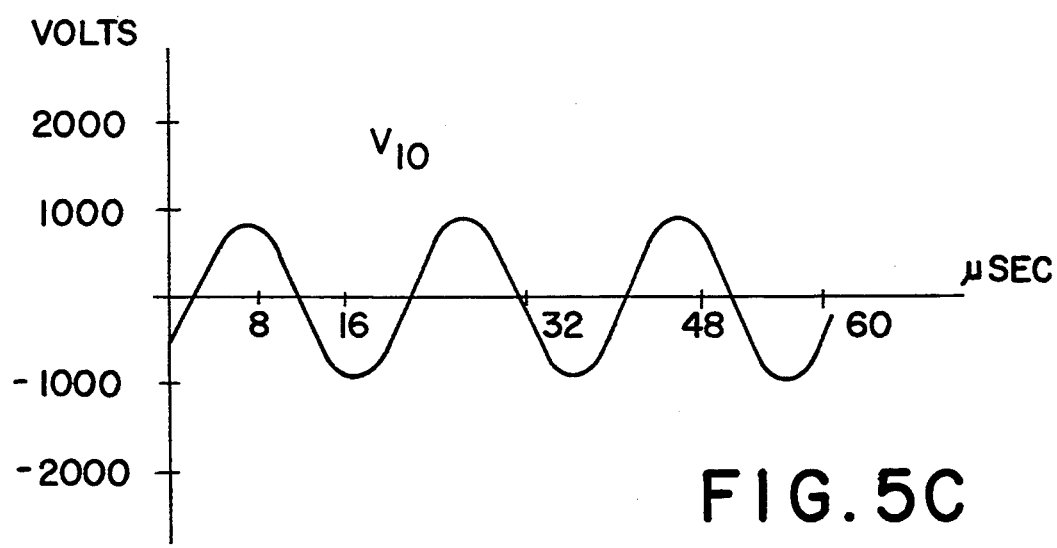
Figure 5D:
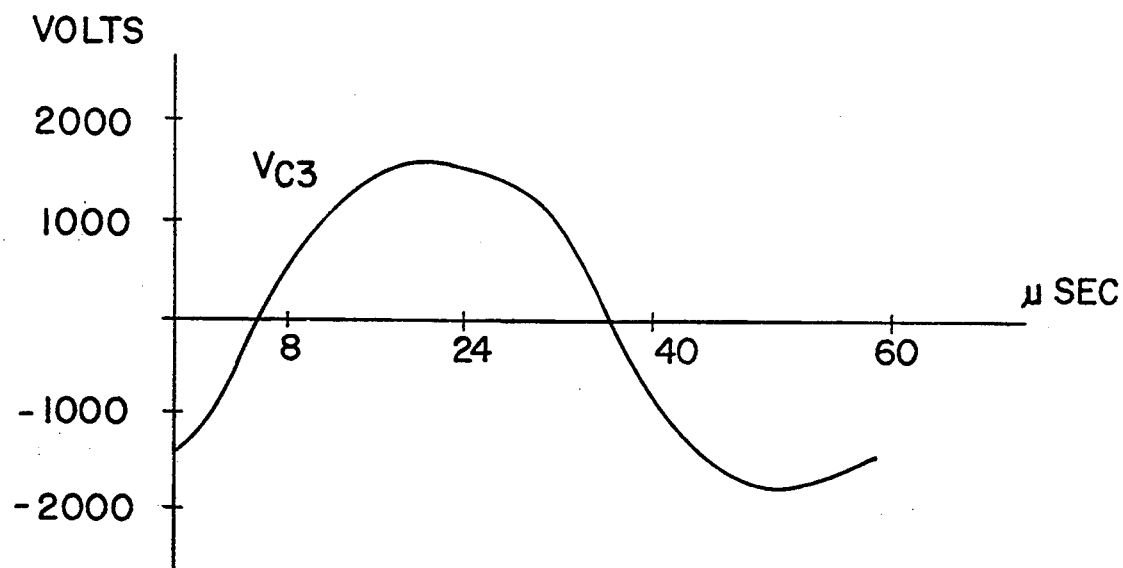
Figure 5E:
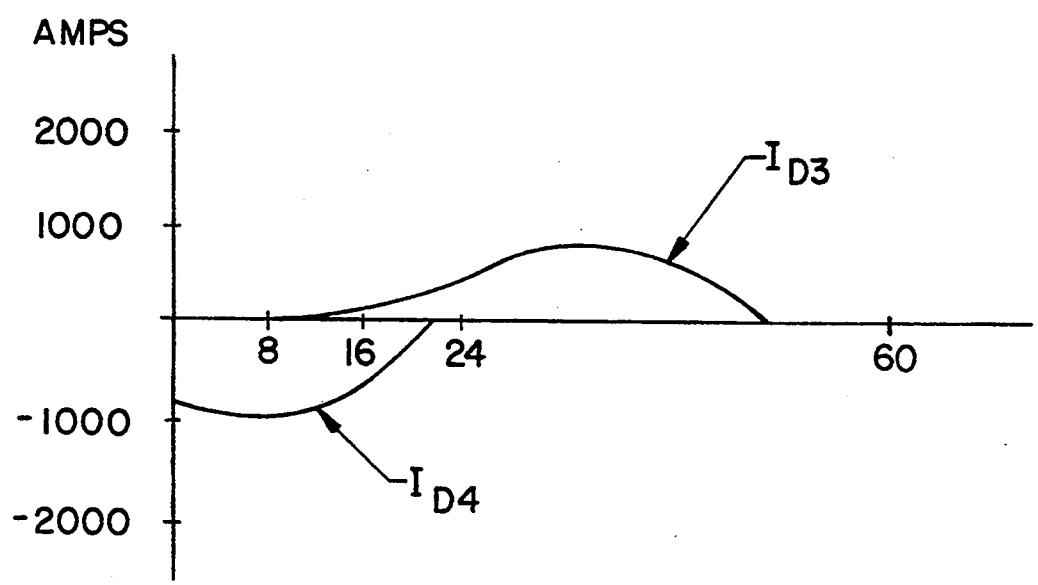
Figure 6:
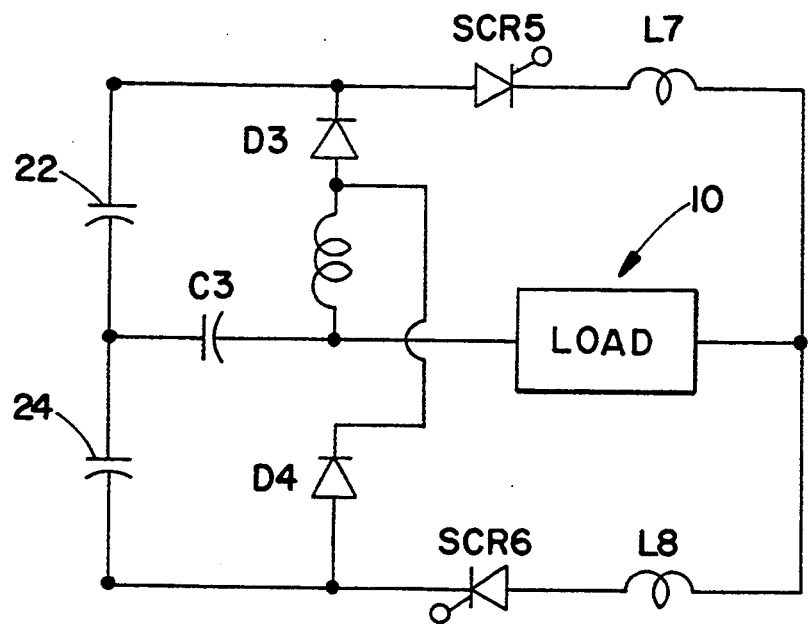
FIGS. 6–12 are alternative but equivalent circuit embodiments to the circuit of FIG. 2.

With particular reference to FIGS. 5A–5E, various wave shapes are shown which depict typical operating conditions of voltage and current across the system components of FIG. 2 on a common time scale to illustrate what happens in the circuit when a thyristor is turned on during steady state operation. The supply voltage 22 is approximately 500 volts, C3 is 15 $\mu f$, L7 and L8 are 2 $\mu h$ and L9 and L10 are 24 $\mu h$. FIG. 5A ($I_{SCR}$) shows the current through SCR5 and SCR6. FIG. 5B ($V_{SCR}$) shows the voltage across them and FIG. 5C shows the resulting voltage across the load ($V_{10}$). The voltage across the commutating capacitor ($V_{C3}$) is shown in FIG. 5D. The current through the clamping diodes ($I_{D3}$, $I_{D4}$) is shown in FIG. 5E. As current flows through a thyristor, voltage will appear across the load, and the voltage on the commutating capacitor will rise until it is gently clamped by the diode and inductor clamping circuits. The FIGURES clearly indicate that at the instant when the system is commutated off, the voltage across the commutating capacitor has reached a magnitude that is safely larger than the peak voltage of the tank and the supply voltage. $V_{C3}$ can also be seen to have a very gradual leak down to a safe value not only for successful maintenance of turn-off time but also for extending the time that the commutating capacitor voltage can be kept at approximately the same value.

The interesting characteristic of the invention is that as the load varies the circuit adjusts and compensates. For example, if the load were a heavy load and accepting a lot of power, then less energy is stored in the capacitor C3 and it will consequently charge up to a relatively lower value so that the voltage difference between the capacitor and the supply will be smaller. Accordingly, the circuit compensates by having a slower leaking down of the capacitor voltage by the clamping diode and inductor. On the other hand if the load were light, so that the capacitor voltage was moving up to a higher value and a larger difference results between the capacitor voltage and supply voltage, then the clamping circuit would leak down at a faster rate. In general, a fairly constant voltage can be maintained on the capacitor thereby allowing a safer operation. All of this is achieved with a single stage inverter and this dynamic clamping action.

Figure 7:
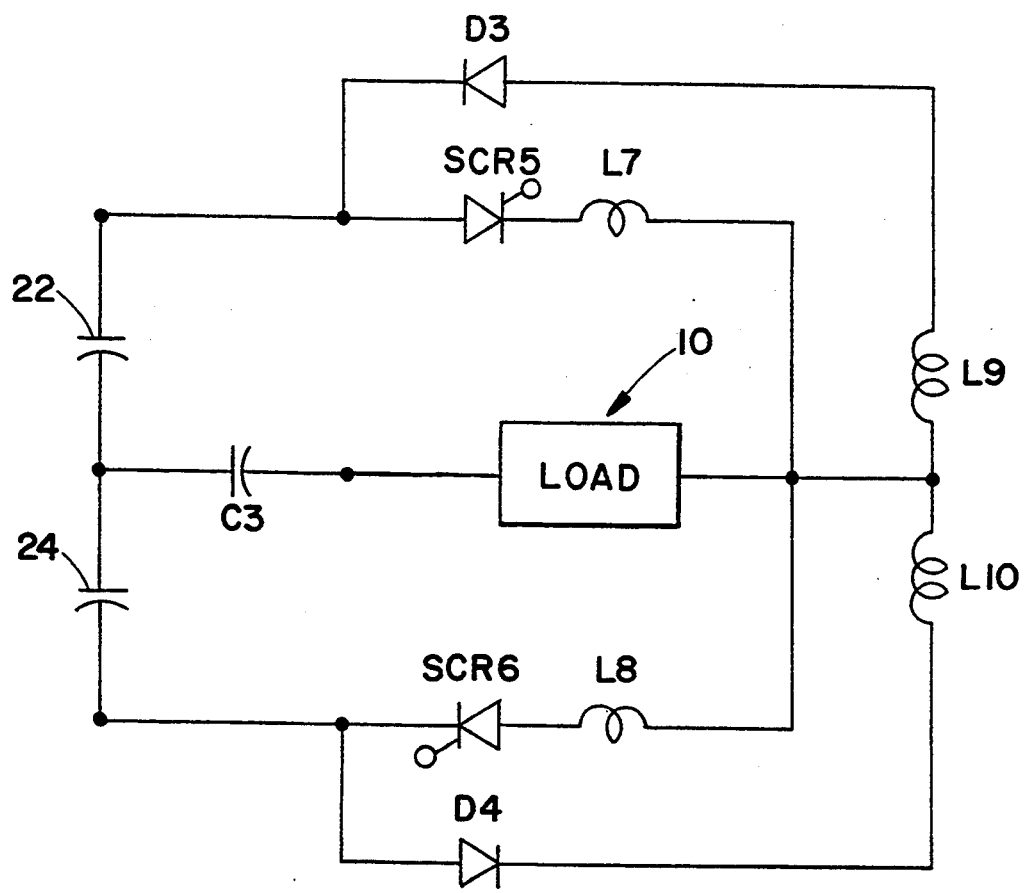
Figure 8:
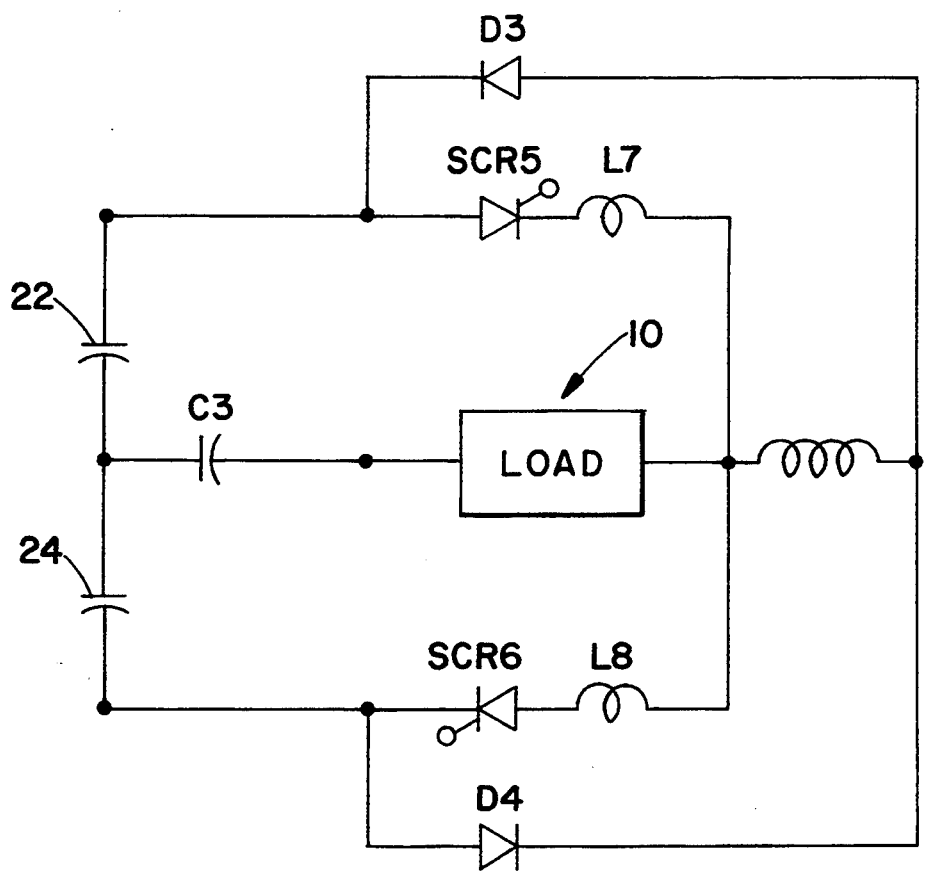
Figure 9:
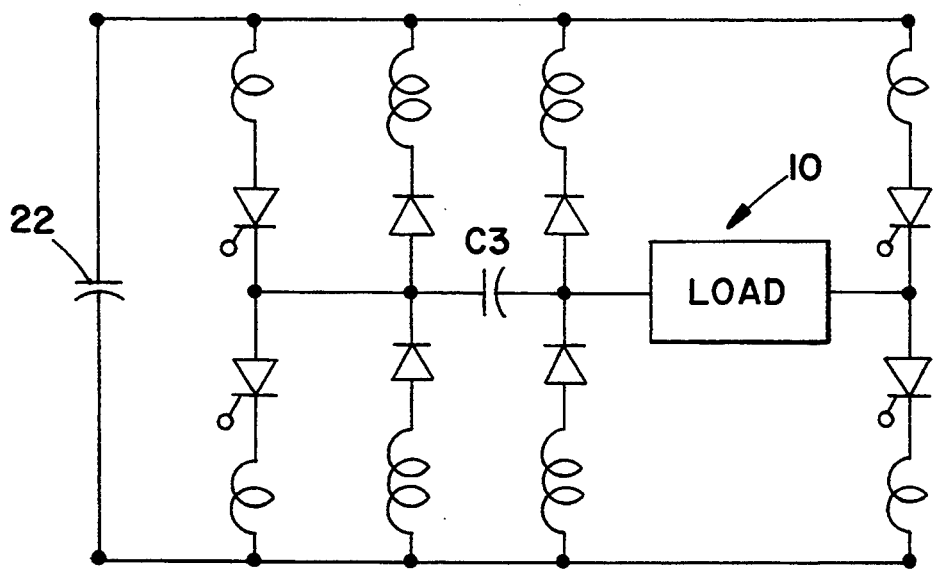
Figure 10:
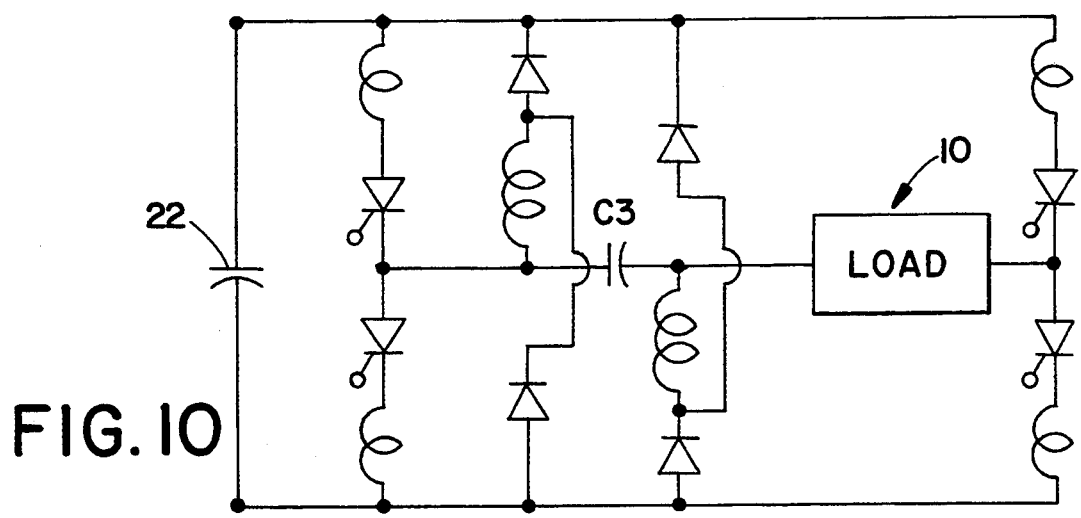
Figure 11:
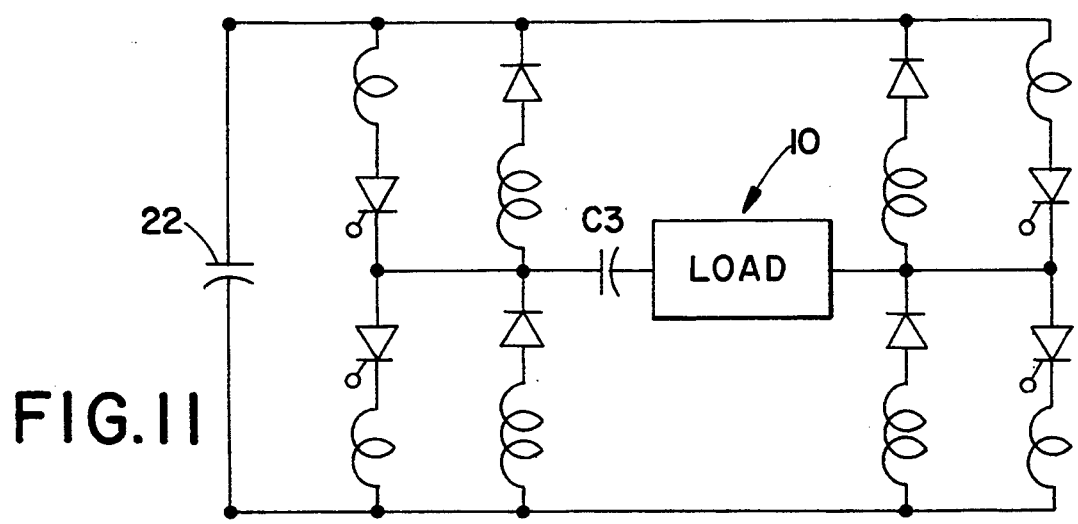
Figure 12:
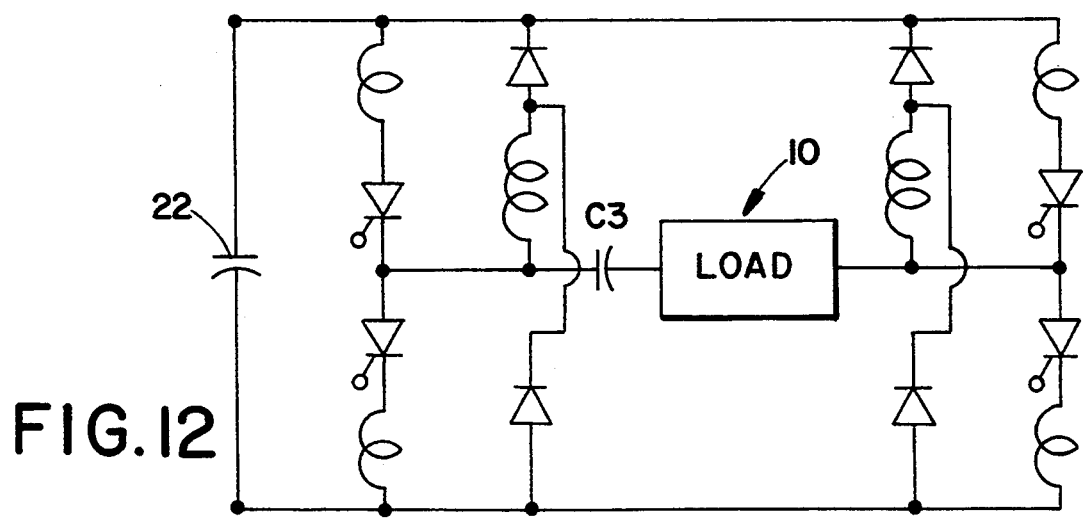

With reference to FIGS. 6–12, FIG. 6 is similar to FIG. 2 but utilizes a single clamp inductance. FIG. 7 clamps the sum of the series capacitor and the load voltage to the DC supply. FIG. 8 is similar to FIG. 7 but utilizes a single clamp inductance. FIG. 9 is a full bridge equivalent of FIG. 2. FIG. 10 is a full bridge equivalent of FIG. 6. FIG. 11 is a full bridge equivalent of FIG. 7. FIG. 12 is a full bridge equivalent of FIG. 8.

As explained in detail with reference to FIG. 2, the key to the operation of the circuits shown in FIGS. 6–12 is the relationship among the series or commutating capacitor, the series inductance (always shown in series with a thyristor), and the clamp inductance (always in series with the clamp diode).

The invention has been described with reference to the preferred embodiment. Obviously, modifications and alterations will occur to others upon a reading and understanding of the specification. It is intended to include all such modifications and alterations in so far as they come within the scope of the appended claims or the equivalents thereof.

Having thus described my invention, I now claim:

1. A power supply for a variable impedance load having a wide load matching range, comprising:
   a voltage source;
   a commutating capacitor disposed for receiving a charge from the voltage source;
   first and second switch means for supplying an alternating voltage to the load;
   first and second clamping means, each associated respectively with the first and second switch means, for limiting a ring-up voltage on the capacitor to a value higher than the voltage source and respectively including first and second clamp inductors having a purposely relatively large value to obtain a dynamic clamp action for the commutating capacitor, wherein the wide load matching range is achieved because the value of the clamp inductors is such to allow the commutating capacitor to maintain the high ring-up voltage for a long enough time to assure selective turn off of the first and second switch means while the alternating voltage goes through an inversion.

2. An inverter circuit useful as a power supply to a tank circuit comprising a variable-impedance load, the inverter circuit comprising:

a voltage source providing a supply voltage;

a neutral capacitor connected to receive a ring-up voltage from the source;

a first switch means and a second switch means disposed relative to the voltage source, the neutral capacitor and the tank circuit to switch alternating voltage to the tank circuit; and, a clamping circuit disposed to clamp the ring-up voltage of the neutral capacitor to a value higher than the voltage source such that a sum of the supply voltage plus a tank circuit voltage peak will be less than the value for a long enough time to assure turn-off of the first and second switch means while the alternating voltage of the tank circuit is inverting.

3. The inverter circuit of claim 2 wherein the clamping circuit comprises a series connected diode and inductor, the inductor having a selected value to allow the neutral capacitor voltage to charge to the ring-up voltage due to a gradual leaking of the neutral capacitor voltage during the inverting of the supply voltage to the tank circuit by switching of the first and second switch means.

4. An inverting circuit for delivering full supply power to a load having a widely varying impedance, comprising:

first and second switch means for alternately switching a supply of power to the load, wherein each switch means has a predetermined safe turn-off time, and each switch means is associated with a series inductor;

a commutating capacitor disposed intermediate of the load and the power supply;

first and second clamping circuit means for dynamically controlling a voltage across the commutating capacitor, each circuit means comprising a series-connected diode and clamping inductor wherein each clamping inductor is selected (1) to achieve safe system commutation assuring the safe turn-off time for the switch means and (2) to limit a voltage level across the commutating capacitor to a safe level that is higher than the voltage level of the power supply while enabling matching of the full supply power into a wide range of load impedances and wherein the voltage level across the commutating capacitor is maintained at the higher level while the supply of power to the load goes through an inversion.

5. The inverting circuit of claim 4 wherein the clamping inductor is selected to be more than an order of magnitude larger than the series inductor.

6. A single stage inverting circuit including a selectively operable switch for generating an alternating current wherein the circuit comprises a commutating capacitor and a dynamic clamping circuit and wherein the clamping circuit includes an inductor sized to effect a gradual leak-off current from the capacitor so that the capacitor is charged in a steady state operation to a voltage greater than a supply voltage to the inverting circuit, which inverts only after a safe switch turn-off time has expired and maintains said voltage on the capacitor for an inversion of the alternating current.

7. A method of operating a single stage inverting circuit including a commutating capacitor, and first and second switches each associated with a series inductor, comprising the steps of:

disposing a clamping circuit in association with the commutating capacitor wherein the clamping circuit has a clamping inductor sized relatively larger than the series inductor;

switching the first switch on to obtain a first half cycle current pulse and charging the capacitor to a peak voltage greater than the supply voltage;

leaking the voltage off the commutating capacitor through the clamping circuit in a gradual manner wherein said commutating capacitor voltage is maintained for a period of time sufficient to assure safe turn-off time for said first switch;

switching the second switch on to obtain a second half cycle current pulse to invert the commutating capacitor voltage to a peak voltage higher than the supply voltage; and, leaking the voltage off the commutating capacitor through the clamping circuit in a gradual manner wherein said commutating capacitor voltage is maintained for a period of time sufficient to assure safe turn-off time for said second switch.

8. The method as described in claim 7 including switching the second switch on to obtain a second half cycle pulse and charging the capacitor to an inverted value of the peak voltage.

9. An inverter circuit system useful as a power supply to a tank circuit comprising a variable-impedance load, the inverter circuit system comprising a plurality of inverter circuits, each including:

a voltage source providing a supply voltage;

a neutral capacitor connected to receive a ring-up voltage from the source;

a first switch means and a second switch means disposed relative to the voltage source, the neutral capacitor and the tank circuit to switch alternating voltage to the tank circuit; and, a clamping circuit disposed to clamp the ring-up voltage of the neutral capacitor to a value higher than the voltage source such that a sum of the supply voltage plus a tank circuit voltage peak will be less than the value for a long enough time to assure turn-off of the first and second switch means while the alternating voltage of the tank circuit is inverting; and, wherein the plurality of the inverter circuits are disposed for sequential operation, the system further including a means for sequencing each of the inverter circuits for running each inverter circuit at a fraction of a total desired output frequency whereby a sum of all outputs of the inverter circuits comprises the desired total output frequency to the load.

10. A method of operating an inverting circuit system comprising a plurality of single stage inverting circuits, each including a commutating capacitor, and first and second switches each associated with a series inductor, comprising the steps of:

disposing a clamping circuit in association with the commutating capacitor wherein the clamping circuit has a clamping inductor sized relatively larger than the series inductor;

switching the first switch on to obtain a first half cycle current pulse and charging the capacitor to a peak voltage greater than the supply voltage;

leaking the voltage off the commutating capacitor through the clamping circuit in a gradual manner wherein said commutating capacitor voltage is maintained for a period of time sufficient to assure safe turn-off time for said first switch;

switching the second switch on to obtain a second half cycle current pulse to invert the commutating capacitor voltage to a peak voltage higher than the supply voltage;

leaking the voltage off the commutating capacitor through the clamping circuit in a gradual manner wherein said commutating capacitor voltage is maintained for a period of time sufficient to assure safe turn-off time for said second switch; and, sequencing the plurality of the single stage inverter circuits to obtain an output frequency to a load comprised of a sum of each output frequency of each of the plurality of single stage inverting circuits.

* * * * *